G. Tiemann,
Scarificator.
Nº 4,705.          Patented Aug. 20, 1846.
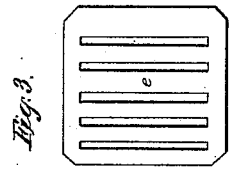
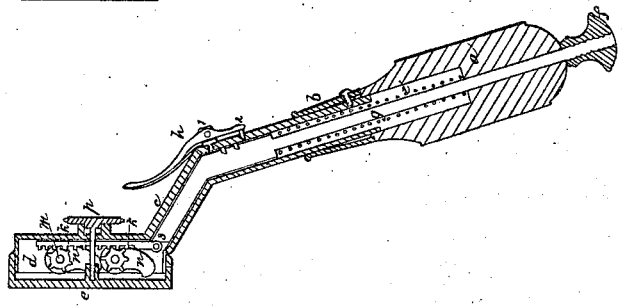
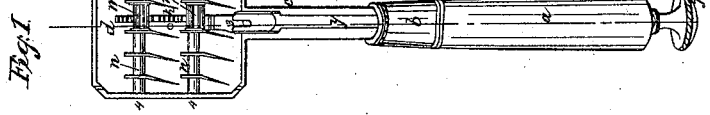
Witnesses:          Inventor:

UNITED STATES PATENT OFFICE.

GEO. TIEMANN, OF NEW YORK, N. Y.

SCARIFICATOR.

Specification of Letters Patent No. 4,705, dated August 20, 1846.

*To all whom it may concern:*

Be it known that I, GEORGE TIEMANN, of the city, county, and State of New York, surgeon's instrument-maker, have invented and made and applied to use certain new and useful improvements in the arrangement, application, and combination of well-known mechanical means to construct and produce what is technically known as a scarificator, to be used in any needful surgical operation and which shall be more easily cleaned, more easy and effective in its operation and application, and having the advantages of the lancet cutting diagonally across the skin and mouths of the capillary blood vessels instead of piercing directly into the flesh and between the vessels, thus allowing the blood to flow with greater freedom and effect and also allow of the wounds so made healing more readily and with less obvious scars, for which improvements I seek Letters Patent of the United States, and that the said improvements as made by me to effect the above recited purposes are fully and substantially set forth in the following description and shown in the drawings annexed to and making a part of this specification, wherein—

Figure 1, is a full sized view of these improvements, with the cap *e*, Fig. 3, removed, to show the interior parts; Fig. 2, is a longitudinal vertical section of the instrument, through the dotted line of Fig. 1; Fig. 3, is a front view of the cap; and, Fig. 2, shows the mode of securing it in place; Fig. 4, is a separate front and end view, of the lancet, and the parts on which they are mounted; and the same letters and numbers as marks of reference, apply to the like parts in all the several figures.

*a*, is the handle, made hollow, and fitted into a socket *b*, with a diagonal arm *c*, to the lancet box *d*, fitted with a cap *e*, made with slots, the inner edges of which are champered off as usual; the cap is shown in Fig. 3, to complete the constructive description, only. At the bottom of the handle *a*, a button *f*, is fixed on that end of a rod *g*, made with an elbow within the arm *c*, and between these points, within the handle *a*, a strong expansive helical spring *i*, surrounds the rod *g*, and operates against a stud, or shoulder, on the rod, to force it outward. At 1, Fig. 2, is a seat, for a joint to the trigger *h*, fitted with a pin 2, going through the smaller and back part of the socket *b*, and into one of two holes, in the rod *g*, according to whether the lancets are "half cocked," or "full cocked." At the outer end of the elbow on the rod *g*, a joint 3, connects that with a small tooth rack *k*, lying between two small pins, in the bottom of the box *d*, the teeth of this rack gear into the pinions *m*, *m*, on the rollers *l*, *l*, and these rollers carry the diagonally set lancets *n*, *n*, shown as five on each roller, but may be more, or less, the shape of these lancets will be best understood, by the drawing, but may be described, as forming a winding face, drooping from the eye, by which they are each mounted on the rollers *l*, each of which is fitted with a small arbor 4, on each end, one end arbor, of each, entering a hole, in one side of the box *d*, the other end arbor dropping in a slotted opening, in the other end of the box, the edge of which is so formed, as to allow of a small hole being drilled along the edge, to receive a pin *o*, which keeps down the lifting arbors of each roller, and keeps all in place. A screw *p*, from the back of the box *d*, enters a deep nut in the back of the cap *e*, and secures that in place, when in use. The slots, in the angles of the box, allow of the full motion of the lancets, and also allow a free egress to any dirt, that may get into the box.

The drawing represents all these parts, as described, and as the first instrument, of this construction, was made; but it will be obvious, that by making the box *d*, in a parallel line to, instead of diagonally with, the handle *a*, so that the rack *k*, and rod *g*, shall move parallel, then the joint 3, can be dispensed with, and the crooked part of the rod *g*, can terminate in one or two arms, from which the rack *k*, may be continued, either single, or double, in the sides and angles of the box *d*, and take the pinion, or pinions *m*, *m*, on the ends of the roller *l*, instead of the middle, as is above described. The lancets are shown, as both sets cutting in one direction, but by placing the rack, or racks, so as to operate one above, and one below the pinions, or by any other analogous mechanical means, the lancets may be set to cut in opposite directions, and the movable arbors 4, may be held in place, by a breech piece, or forelock or any similar means, instead of the pin *o*, as described and shown herein; and a wood or leather packing, placed into the hollow of the arm c, to take the recoil of the rod g, in the crooked part of the arm c, of the socket, will prevent the unpleasant sound, or "click," usually caused by the action of the parts when used; these differences, and variations, may be used, without any substantial departure from the constructive arrangements hereinbefore described.

In the patent, issued to me, on the 26 August 1834, for improvements in scarificators, an instrument is described, more costly and operose in construction, more difficult to repair and clean, and not fitted with lancets set to act diagonally, when cutting. Since that patent, no actual improvement is known, by me, to have been effected in such instruments, and although many of these parts, used by me, are to be found in other surgical instruments, no one instrument has them so applied, or combined, to produce a similar effect.

What I claim as new and desire to secure by Letters Patent, is—

1. The application of lancets set to cut diagonally, instead of direct.

2. The combination, with the lancets so set, of the rod g, spring i, and trigger h, arranged to act by the rack k, and pinions m, to give the required motion to the lancets, the whole constructed and operating substantially as described.

In witness whereof, I have hereunto set my hand in the city of New York this twenty-first day of March one thousand eight hundred and forty six.

GEO. TIEMANN. [L.S.]

Witnesses:
 WM. TERRELL,
 LEMUEL W. TERRELL.